United States Patent
Krogius

(10) Patent No.: US 9,639,715 B2
(45) Date of Patent: May 2, 2017

(54) PROTECTING USER IDENTIFIABLE INFORMATION IN THE TRANSFER OF TELEMETRY DATA

(71) Applicant: Microsoft Technology Licensing, LLC, Redmond, WA (US)

(72) Inventor: Oleg Krogius, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 60 days.

(21) Appl. No.: 14/697,458

(22) Filed: Apr. 27, 2015

(65) Prior Publication Data

US 2016/0314315 A1   Oct. 27, 2016

(51) Int. Cl.
G06F 21/00 (2013.01)
G06F 21/62 (2013.01)
H04L 29/06 (2006.01)
G06F 21/57 (2013.01)

(52) U.S. Cl.
CPC ........ *G06F 21/6245* (2013.01); *G06F 21/577* (2013.01); *G06F 21/6263* (2013.01); *H04L 63/101* (2013.01)

(58) Field of Classification Search
CPC . G06F 21/6245; G06F 21/6263; H04L 63/101
See application file for complete search history.

(56) References Cited

U.S. PATENT DOCUMENTS 6,704,730 B2   3/2004   Moulton et al.
8,214,895 B2   7/2012   Kuo et al.
8,335,821 B2   12/2012  Bocirnea
(Continued)

FOREIGN PATENT DOCUMENTS

CN    102811213 A    12/2012
EP      2779016 A1    9/2014

OTHER PUBLICATIONS

"International Search Report & Written Opinion Issued in PCT Application No. PCT/US2016/026086", Mailed Date: Jun. 15, 2016, 10 Pages.

(Continued)

*Primary Examiner* — Mahfuzur Rahman
(74) *Attorney, Agent, or Firm* — Jacob P. Rohwer; Newport IP, LLC

(57) ABSTRACT

This disclosure describes systems and method for preventing the transfer of 'user-identifiable information' from a client device while collecting telemetry data that is relevant to features of an operating system or computing application. In various examples, telemetry data is gathered to monitor the performance or use of an operating system or computing application. The process of collecting telemetry data can involve capturing data associated with files that are not directly associated with the operating system or computing application that is being monitored. This disclosure presents techniques that use a cryptographic hash function to prevent user identifiable information from being revealed in file attributes during the process of collecting telemetry data. A user's privacy is protected by the computational impracticability of recreating the original filename from the hash value.

12 Claims, 8 Drawing Sheets

(56) References Cited

U.S. PATENT DOCUMENTS

| | | |
|---|---|---|
| 8,620,879 B2 | 12/2013 | Cairns |
| 8,732,825 B2 | 5/2014 | Park et al. |
| 2006/0236389 A1 | 10/2006 | Horne |
| 2010/0242094 A1 | 9/2010 | Hussain et al. |
| 2010/0281133 A1 | 11/2010 | Brendel |
| 2013/0103651 A1 | 4/2013 | Jha et al. |
| 2013/0111591 A1 | 5/2013 | Topan et al. |
| 2013/0227692 A1 | 8/2013 | Pavlyushchik |
| 2013/0268491 A1 | 10/2013 | Chung et al. |
| 2014/0101482 A1 | 4/2014 | Zhou et al. |
| 2014/0122451 A1 | 5/2014 | Euresti et al. |
| 2014/0250156 A1 | 9/2014 | Chatry |
| 2014/0337979 A1 | 11/2014 | Pereira et al. |
| 2016/0099963 A1* | 4/2016 | Mahaffey ............ H04L 63/1433 726/25 |
| 2016/0203336 A1* | 7/2016 | Nambiar ............. G06F 21/6254 726/26 |

OTHER PUBLICATIONS

Pucha, et al., "Adaptive File Transfers for Diverse Environments", in Proceedings of USENIX Annual Technical Conference, Jun. 22, 2008, 21 pages.

Nichols, et al., "Technology Demo: Real-time Control and Telemetry", Published on: Feb. 27, 2013 Available at: http://open.enernoc.com/blog/2013/02/27/technology-demo-real-time-control-and-telemetry/.

* cited by examiner

PROTECTING USER IDENTIFIABLE INFORMATION IN THE TRANSFER OF TELEMETRY DATA

BACKGROUND

Operating system and applications often rely on collecting telemetry data to better understand how particular features are performing or being used. Typically, over a given period of time telemetry data can assist developers in isolating features of an operating system or an application that unexpectedly use a large amount of resources. With this information, developers can effectively prioritize which features may need to be optimized to improve the performance of the operating system or application.

Telemetry data for storage is often collected from selected folders that are associated with the operating system or application. In these circumstances, the process of collecting telemetry data often introduces privacy implications, particularly when users choose to store personal information in the selected folders. Such personal information is then collected, which may be undesirable for the user.

SUMMARY

This disclosure describes systems and method for preventing the transfer of 'user-identifiable information' from a client device to an entity while collecting telemetry data. In various examples, telemetry data is gathered to monitor the performance of operating systems or computing application that are stored on a client device. The process of collecting telemetry data can involve capturing data from the client device that is not directly associated with the intended operating system or computing application. As a result, user-identifiable information can be inadvertently revealed in file attributes, such as a filename. This disclosure presents techniques that use a cryptographic hash function to prevent user identifiable information from being revealed in telemetry data that is being transferred. A user's privacy ultimately can be protected by the computational impracticability of inverting the hash value and recreating the original filename.

This Summary is provided to introduce a selection of concepts in a simplified form that is further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF DRAWINGS

The detailed description is described with reference to the accompanying figures. In the figures, the left-most digit(s) of the reference number identified the figure in which the reference number first appears. The same reference numbers in different figures indicate similar or identical items.

DETAILED DESCRIPTION

Overview

Figure 1:
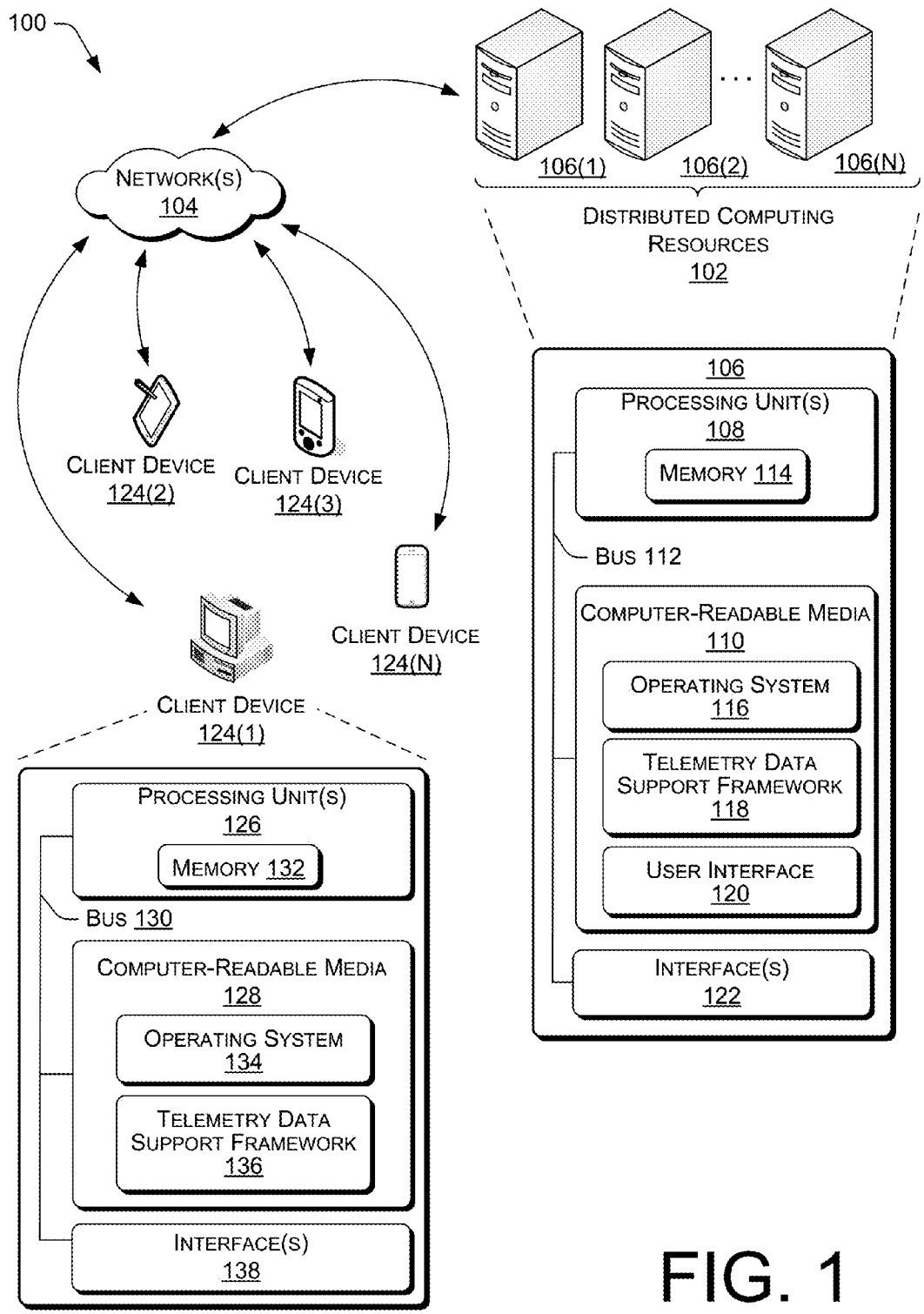
FIG. 1 is pictorial diagram that illustrates an example environment for protecting user identifiable information in telemetry data.

Examples described herein provide constructs of methods and system for protecting user privacy while gathering telemetry data associated with a list of files that is stored on a client device. In various examples, performance characteristics of features within an operating system or computing application can be identified by gathering telemetry data. In a non-limiting example, telemetry data can indicate atypical growth in file sizes associated with an operating system or computing application. In some instances, the growth in file size can indicate that a particular feature of the operating system or computing application is not performing as originally intended or is being used in an unanticipated way.

The term 'telemetry data,' as used herein, describes data that represent characteristics of a file, a set of files, or a file system. The data can include a number of files within a file system, file names of the files within the file system, corresponding file sizes of the files, and corresponding file location attributes of the files. Other attributes of files can also be included, for example, security descriptors, access rights, access characteristics, creation time, and access time. However, these attributes are not discussed in this detailed description for purposes of brevity.

In various examples, telemetry data is gathered from a list of files that is associated with an operating system or computing application. The list of files can include system files for an operating system, system files for a computing application, reference data files associated with a proprietary computing application, or personal files associated with an end user of a client device. In some examples, telemetry data is gathered from all files within a file system.

In instances where the list of files includes personal files, telemetry data is likely to include 'user-identifiable information.' For example, filenames of personal files often reveal 'user-identifiable information.' The term, "user-identifiable information," as used herein, is used to describe any type of non-system related information that can be used to identify or describe an aspect of an end user. As a non-limiting example, consider a file within a file system having a filename of "julies_cat_picture_0343.jpeg." The transfer of telemetry data that corresponds to the filename "julies_cat_picture_0343.jpeg" reveals at least some user-identifiable information of an end user. That is, the end user's name may be Julie or the end user may have at least some association with a person named Julie who has a cat.

This disclosure presents techniques to prevent the transfer of 'user-identifiable information' from a client device while collecting telemetry data that is relevant to features of an operating system or computing application. In various examples, a client device can capture telemetry data for a full list of files within a file system. The telemetry data can include filenames, corresponding file sizes, and corresponding file location attributes for each file. To protect an end user's privacy in user-identifiable information, the client device can perform a one-way hash on all filenames on the list of files. The one-way hash can replace the original filename of each file in the list of files with a corresponding hash value.

The term "one-way hash," as used herein, describes a process performed by a cryptographic hash function that produces a hash value for a given input. In various examples, a hash function can produce a hash value for an input string, such as the filename of a data file. In other examples, the hash function can produce a hash value that corresponds to content of the data file. A cryptographic hash function has two distinct features. Firstly, it is computationally impractical to invert a hash value and recreate the original input. Therefore, the privacy of the original input, in this case, the filename, is protected. Secondly, it is exceptionally unlikely that any two different inputs would hash to the same hash value. This ensures that each input receives an exclusive hash value with very high probability. In various examples, the transfer of a hash value can use symmetric encryption. In other examples, an asymmetric encryption can be used. In yet another example, the transfer of a hash value can occur without encryption.

In some examples, in response to performing the one-way hash of each filename, the telemetry data can be transmitted to a computing device associated with an entity. The entity can receive telemetry data that includes a hash value of each filename along with a corresponding file size and file location attribute for the files in a list of files.

In various examples, the entity can include software developers that develop and support operating systems and computing applications. In some examples, an entity can include a service provider that collects telemetry data on behalf of another interested party. In some examples, an entity can be an organization that monitors the performance and use of proprietary applications or proprietary reference data on a client device.

In various examples, the entity can maintain a separate white list of files associated with the operating system or computing application that corresponds to the list of files represented by telemetry data received by the entity. In some examples, the white-listed files can include "system" files that are frequently found within file systems and therefore may not convey "user-identifiable information". In some examples, the white list can include the original filenames of each file along with a corresponding hash value. While the hash function provides a different hash value for different filenames, the hash function will provide the same hash value for a same filename despite being performed at different times or on different devices. For example, consider at a first point in time, a file named "calc.exe" is hashed on a client device to produce a hash value of "901". At a second point in time, the same "calc.exe" file can be hashed on a different device, such as an entity server, and produce the same hash value of "901". Therefore, the entity can generate a white list of files at any point in time before or after receiving a list of files from a client device.

In various examples, the entity can compare the filename hash values on the entity's white list with filename hash values received from a client device. In instances where a matching pair of hash values is identified, the entity can deduce with very high probability that the hash value corresponds to a white-listed file. For example, the file "calc.exe" can produce a hash value of "901" on the list of files from the client device. Further, the same file, "calc.exe," can produce the same hash value of "901" on the entity's white list. Therefore, by matching filename hash values, the entity can identify the hash value of "901" on the list of files from the client device as belonging to the original file, "calc.exe."

As mentioned earlier, an advantage of having a white list stored on an entity server is that the white list can be created at any point in time, before or after receiving a list of files from an end user device. The entity can repeat the process to identify a number of or all files on the list of files received from the client device and replace the matching filename hash values with original filenames. After the process has identified the matching filename hash values, an aggregated list of files can include original filenames for white-listed files and hash values for all other files. Therefore, the process ensures that any user-identifiable information that could be revealed in a non-white-listed filename remains as a hash value, thereby protecting the end user's privacy.

In various examples, the techniques described herein can be applied to data identifiers other than filenames. In at least one example, the methods and systems can apply to data items such as folders, archives, and labels. In another example, the methods and systems can monitor the performance and use of web pages that are associated with an organization or other entity. In this example, the organization can maintain a white list of domain names that correspond to the organization's web pages. Using the methods and system disclosed herein, hash values that correspond to cached domain names can be retrieved from client devices or employee devices to assist in providing telemetry data that sheds light on the use of the organization's web pages. The process subsequently replaces hash values that correspond to domain names associated with the organization's web pages with the actual domain names. Moreover, the process ensures that any user-identifiable information that could be revealed in cached domain names associated with non-organization web pages remain as hash values, thereby protecting the end user's privacy.

A technical advantage of generating a white list of system files on an entity's computing device is that the client does not incur the disk-usage cost of storing a static white list of system files. Moreover, because the entity can generate the white list at any point in time, the entity can update the white list in response to identifying unanticipated investigations, rather than having to rely on updating a static white list on a client device. Further, by leveraging the use of a hash function, the techniques described herein also improve user experience, as well as reducing network bandwidth and improving processor efficiencies. User experience is ultimately improved by providing a better guarantee of a user's privacy as well as transferring telemetry data to an entity that can be used to optimize an operating system or computing application. Further, network bandwidth usage may be reduced in some instances because only a list of files with hash values of fixed size are transferred to an entity, rather than the encrypted versions of the files themselves.

Various examples, scenarios, and aspects are described further with reference to FIGS. 1-8.

Illustrated Environment

The environment described below constitutes but one example and is not intended to limit the claims to any one particular operating environment. Other environments can be used without departing from the spirit and scope of the claimed subject matter.

FIG. 1 is a pictorial diagram that illustrates an example environment 100 of a system for transferring cryptographic hashes of telemetry data from a client device. In some examples, the various devices and/or components of environment 100 can include distributed computing resources 102 that can communicate with one another and with external devices via one or more network(s) 104. In some examples, the distributed computing resources 102 initiate a request and ultimately receive telemetry data associated with an operating system or computing application that stored on a client device.

In various examples, the distributed computing resources 102 can correspond to an entity that develops and/or supports functionality of an operating system or a computing application stored on a client device. In some examples, the distributed computing resources 102 can correspond to a service provider that collects the telemetry information on behalf of the entity.

In some examples, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), personal area networks (PANs), body area networks (BANs), near field communication (NFC), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX, or multiples or combinations thereof.

In the illustrated example, a cluster 102 of distributed computing resources can include computing device(s) 106(1)-106(N) (individually or collectively referred to herein with reference 106), where N is any integer greater than or equal to 1. Although illustrated as, e.g., desktop computers, computing device(s) 106 can include a diverse variety of device categories, classes, or types such as laptop computers, tablet computers, or cellular phones, and are not limited to a particular type of device. In the illustrated example, computing device(s) 106(1)-106(N) can be computing nodes in the cluster 102, e.g., a cloud service such as MICROSOFT AZURE. In the illustrated example, computing device(s) 106 can be clients of cluster 102 and can submit jobs to cluster 102 and/or receive job results from cluster 102. Computing devices 106(1)-106(N) in cluster 102 can, e.g., share resources, balance load, increase performance, or provide fail-over support or redundancy. Computing device(s) 106 can additionally or alternatively operate in a cluster or grouped configuration.

By way of example and not limitation, computing device(s) 106 can include, but are not limited to, server computers or blade servers such as Web servers, map/reduce servers or other computation engines, or network-attached-storage units (e.g., laptop computers, thin clients, terminals, or other mobile computers, wearable computers such as smart watches or biometric or medical sensors, implanted computing devices such as biometric or medical sensors, computer navigation client computing devices, satellite-based navigation system devices including global positioning system (GPS) devices and other satellite-based navigation system devices, tablet computers or tablet hybrid computers, smart phones, mobile phones, mobile phone-tablet hybrid devices, or other telecommunication devices, portable or console-based gaming devices or other entertainment devices such as network-enabled televisions, set-top boxes, media players, cameras, or personal video recorders (PVRs), automotive computers such as vehicle control systems, vehicle security systems, or electronic keys for vehicles, personal data assistants (PDAs), desktop computers, or integrated components for inclusion in computing devices, appliances, or other computing device(s).

Device(s) 106 can include any computing device having one or more processing unit(s) 108 operably connected to computer-readable media 110 such as via a bus 112, which in some instances can include one or more of a system bus, a data bus, an address bus, a PCI bus, a Mini-PCI bus, and any variety of local, peripheral, and/or independent buses. The processing unit(s) 108 can also include separate memories such as memory 114 on board a CPU-type processor, a GPU-type processor, an FPGA-type accelerator, a DSP-type accelerator, and/or another accelerator. Executable instructions stored on computer-readable media 110 can include, for example, an operating system 116, a telemetry data support framework 118, a user interface 120, and other modules, programs, or applications that are loadable and executable by processing unit(s) 108.

Alternatively, or in addition, the functionality described herein can be performed, at least in part, by one or more hardware logic components such as accelerators. For example, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

In the illustrated example, the operating system 116 can be any operating system including but not limited to MICROSOFT WINDOWS, WINDOWS PHONE, QNX™, IBM z/OS™, LINUX, ANDROID, iOS™, OS X™, NETBSD™, or any other operating system capable of managing computer hardware and software resources.

Computer-readable media 110 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in device 106, while in some examples one or more of a CPU, GPU, and/or accelerator is external to device 106.

Device(s) 106 can include interface(s) 122 to enable communications between the client device 124 and other networked devices. The interface(s) 122 can include one or more network interface controllers (NICs), I/O interfaces, or other types of transceiver devices to send and receive communications over a network. For simplicity, other components are omitted from the illustrated device 106.

Client device(s) 124 can include, for example one or more devices 124(1)-124(N). Client device(s) 124 can belong to a variety of categories or classes of devices, which can be the same as or different from devices 106, such as client-type devices, desktop computer-type devices, mobile-type devices, special purpose-type devices, embedded-type devices, and/or wearable-type devices. Thus, although illustrated as mobile computing devices, which may have less computing resources than device(s) 106, client computing device(s) 124 can include a diverse variety of device types and are not limited to any particular type of device. Client computing device(s) 124 can include, but are not limited to, personal data assistants (PDAs) 124(2), mobile phone tablet hybrid 124(3), tablet computers 124(4), mobile phones, laptop computers, other mobile computers, wearable computers, implanted computing devices, desktop computers, automotive computers, network-enabled televisions, thin clients, terminals, game consoles, gaming devices, work stations, media players, personal video recorders (PVRs), set-top boxes, cameras, integrated components for inclusion in a computing device, appliances, or any other sort of computing device configured to receive user input.

Client computing device(s) 124 of the various categories or classes and device types described above, can have one or more processing units 124 operably connected to computer-readable media 128 such as via a bus 130, which in some instances can include one or more of a system bus, a data bus, an address bus, a PCI bus, a Mini-PCI bus, and any variety of local, peripheral, and/or independent buses. The processing unit(s) 126 can also include separate memories such as memory 132 on board a CPU-type processor, a GPU-type processor, an FPGA-type accelerator, a DSP-type accelerator, and/or another accelerator. Executable instructions stored on computer-readable media 128 can include, for example, an operating system 134, a Telemetry data support framework 136, and other modules, programs, or applications that are loadable and executable by processing unit(s) 126. In various examples, the operating system 134 can correspond to operating system 116.

Client device(s) 124 can also include interface(s) 138 to enable communications between the client device 124 and other networked devices, such as device(s) 106. In various examples, interface(s) 138 can correspond to interface(s) 122.

Computer-readable media, such as 110 and/or 128, may include computer storage media and/or communication media. Computer storage media can include volatile memory, nonvolatile memory, and/or other persistent and/or auxiliary computer storage media, removable and non-removable computer storage media implemented in any method or technology for storage of information such as computer-readable instructions, data structures, program modules, or other data. Memories 114 and/or 132 can be examples of computer storage media. Computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media embodies computer-readable instructions, data structures, program modules, or other data in a modulated data signal, a carrier wave, or a propagated signal. As defined herein, computer storage media does not include communication media.

Figure 2:
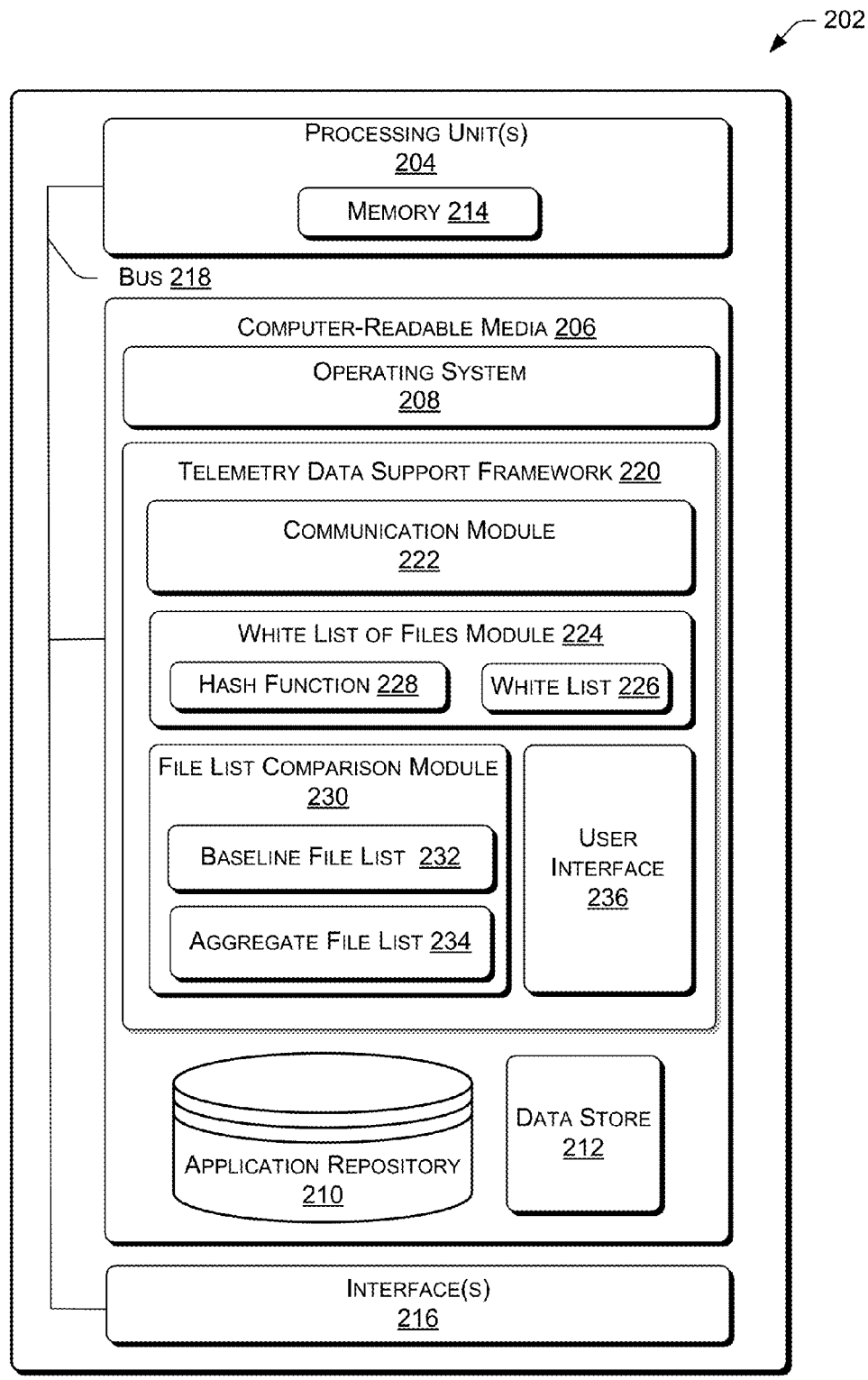
FIG. 2 is a block diagram that illustrates select components of an example entity server including a Telemetry Data Support Framework consistent with FIG. 1.

FIG. 2 is a block diagram that illustrates select components of an example computing device 200 that is configured to initiate a request for telemetry data and ultimately receive telemetry data from a client device. In various examples, the computing device 200 can correspond to device 106.

Computing device 202 can include one or more processing units 204 operably connected to computer-readable media 206. In computing device 202, processing unit(s) 204 can represent, for example, a CPU-type processing unit, a GPU-type processing unit, a field-programmable gate array (FPGA), another class of digital signal processor (DSP), or other hardware logic components that may, in some instances, be driven by a CPU.

In some examples, computing device 202 can be one of a plurality of devices, which are capable of connection via a network. In some examples, computer-readable media 206, which can correspond to computer-readable media 110, can store instructions executable by an external accelerator, such as an FPGA type accelerator, a DSP type accelerator, or any other internal or external accelerator. In some examples, at least one CPU, GPU, and/or accelerator is incorporated in computing device 202, while in other examples, one or more of a CPU, GPU, and/or accelerator can be external to computing device 202.

In the illustrated example, the computer-readable media 206 includes an operating system 208, which can correspond to operating systems 116.

In the illustrated example, the computer-readable media 206 also includes an application repository 210. The application repository 210 can include structured or unstructured application data storage. In various examples, the application repository 210 stores application information such as file size, operating system, capabilities, and any other information specific to an application.

In the illustrated example, the computer-readable media 206 also includes a data store 212. Data store 212 can store data for the operations of processes, applications, components, and/or modules stored in computer-readable media 206 and/or executed by processing unit(s) and/or accelerator(s) 204. Alternatively, some or all of the above-referenced data can be stored on separate memory 214 on board the one or more processing unit(s) 204. The separate memory 214 can correspond to memory 114.

Computing device 202 can include interface(s) 216, which can correspond to interface(s) 122 and 138. Interface(s) 216 can include network interface controllers (NICs), I/O interfaces, or other types of transceiver devices to send and receive communications over a network.

Computing device 202 can operably connect the processing units (204) to computer-readable media 206, interface(s) 216 via a bus 218. In various examples, bus 218 can correspond to bus 112 and 132.

In the illustrated example, computer-readable media 206 can also include a telemetry data support framework 220, which can correspond to telemetry data support frame work 118. In various examples, the telemetry data support framework 220 includes a communication module 222. The communication module 222 can transmit a signal to a client device indicating a request for telemetry data for a full set of files in a file system on the client device. In other examples, the communication module 222 can transmit a signal to request telemetry data for a set of files in select folders that correspond to the operating system 208 or a computing application that is installed on the computing device 202.

In some examples, the communication module 222 can transmit the signal requesting a full list of files to a plurality of client devices on a given network. For example, consider a plurality of client devices operating on a same network that store a same operating system 208 or a same computing application. The communication module 222 can transmit a signal to some or all client devices on the single network to request telemetry data of a set of files from each file system. In other examples, the communication module 222 can schedule a transmission of the signal to the some or all of the client devices on the single network to request the telemetry data. In various examples, the plurality of client devices can correspond to a same end user. In some examples, the plurality of client devices can correspond to different end users.

In at least one example, the communication module 222 can receive a full list of files from one or more client devices. As described earlier, the telemetry data for a full list of files can include, but is not limited to, a hash value of an original filename, corresponding file sizes and corresponding file location attributes for each file. In various examples, the full list of files can include a list of all files on a file system of a client device. In some examples, the full list of files can include a list of all files in select folders that correspond to the operating system 208 or computing application.

In at least one example, the telemetry data support framework 220 can include a white list of files module 224. In some examples, the white list of files module 224 can generate a list of system files that correspond to at least one of the operating system 208 or one or more computing applications. In various examples, the list of system files comprises a clean installation that corresponds to an operating system 208 or computing application.

In some examples, the white list of files module 224 can generate a hash value for each filename in the list of files using a one-way hash function 228. Subsequently, the white list of files module 224 can generate a white list 226 that includes an original filename, and a hash value of the filename, the corresponding file size and/or the corresponding file location attribute for each file.

In various examples, the telemetry data support framework 220 includes a file list comparison module 230. In some examples, the file list comparison module 230 receives a baseline file list 232 from a client device via the communication module 222 and a white list 226 from the white list of files module 224. In some examples, the file list comparison module 230 compares the filename hash values in the baseline file list 232 with the white list 226.

The file list comparison module 230 can identify a matching pair of hash values between the baseline file list 232 and the white list 226. In response to identifying a matching pair of hash values, the file list comparison module 230 can generate an aggregate file list 234 by replacing the matching filename hash values on the baseline file list 232 with original filenames sourced from the white list 226. As a non-limiting example, consider the file list comparison module 226 identifying a file with a filename hash value of "901" from the baseline file list 232 and the white 226. The file list comparison module 230 can refer to the white list 226 to determine that the hash value of "901" corresponds to a file named "calc.exe." Therefore, the file list comparison module 230 can generate an entry in the aggregate file list 234 that replaces the filename hash value "901" with the original filename "calc.exe."

In response to replacing matching filename hash values on the baseline file list 230 with original filenames sourced from the white list 226, the aggregate file list 234 can describe all white-listed files with original filenames, and all non-white-listed files with hash values. This process ensures that any user-identifiable information that could be revealed in a non-white-listed filename remains hidden as a hash value, therefore protecting the end user's privacy.

In at least one example, the telemetry data support framework 220 includes a user interface 236. The user interface 236 can operate on computing device 202 in conjunction with interface(s) 216 to enable executable instructions based at least in part on a user input. The user interface 236 can be activated by at least one of a touch input, a pen input, a mouse click, a keyboard selection, voice input, gesture input, or any other input mechanism. In various examples, the user input can include identifying files to generate a white list 226. The white-listed files can correspond to at least one of the operating system 208 or one or more computing applications. In some examples, the white-listed files can correspond to an entity's proprietary data files. In some examples, the user input can identify an operating system or a computing application. The white-listed files can be identified based at least in part on an association with the operating system or the computing application.

In various examples, functionality associated with blocks 222, 224, and 230 can be combined to be performed by a fewer number of modules, or it can be split and performed by a larger number of modules. For example, the white list of files module 224 can be split into separate modules that individually create a white list of files and generate hash values using a one-way hash function. The file list comparison module 230 can also be split into separate modules that compare hash values from separate lists of files, and aggregate both lists of files to form a single list having original filenames for white-listed files and hash values for non-white-listed files.

Figure 3:
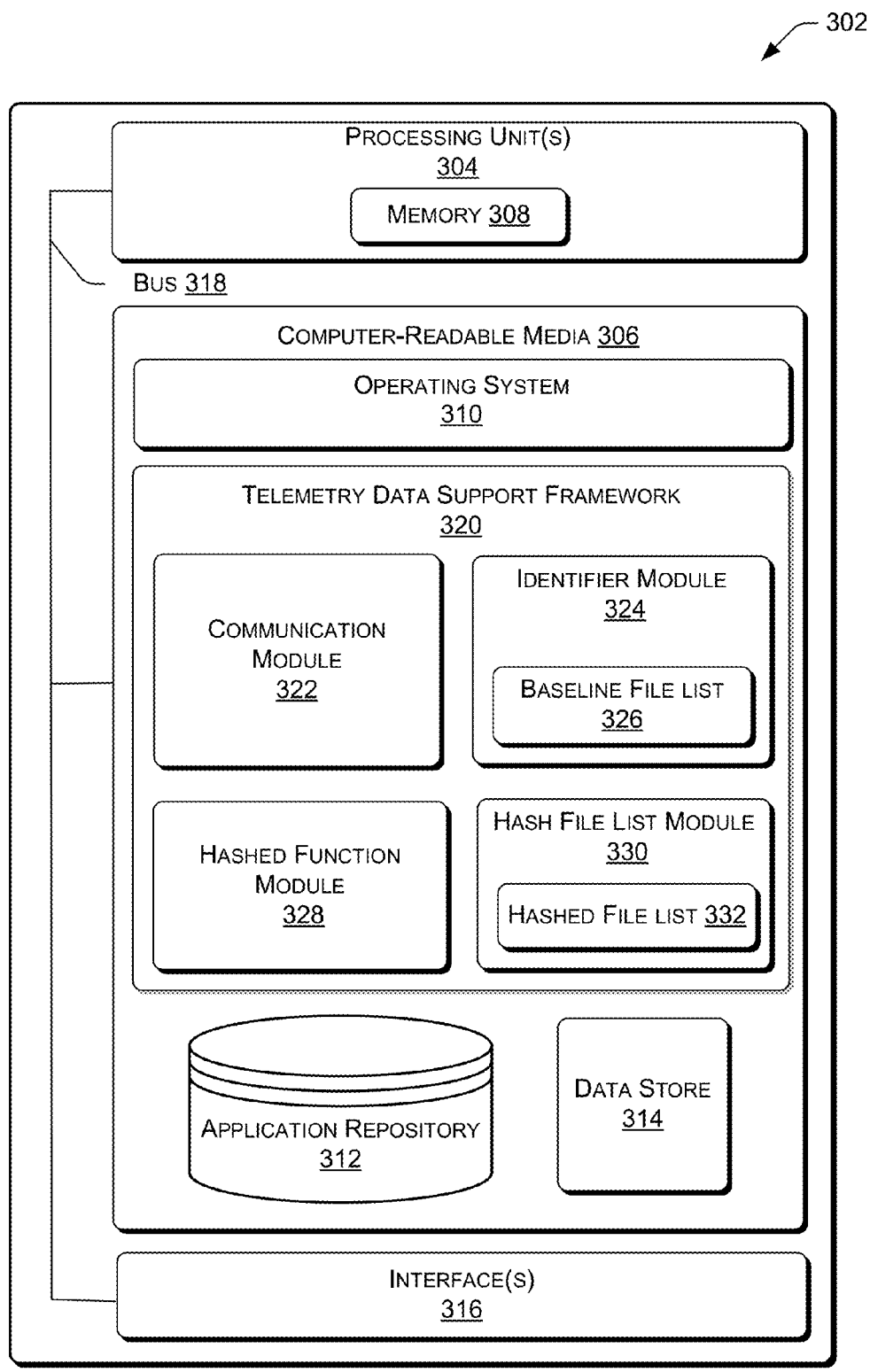
FIG. 3 is a block diagram that illustrates select components of an example client device including a Telemetry Data Support Framework consistent with FIG. 1.

FIG. 3 illustrates example architecture of a client device 302 that supports a transfer of telemetry data. In various examples, the client device 302 can correspond to client device 124. Client device 302 can include processing unit(s) 304, operably connected to computer-readable media 306. The processing unit(s) 304 can correspond to processing unit(s) 126 and the computer-readable media 306 can correspond to computer-readable media 128. In some examples, the processing unit(s) 304 can include separate memory 308, which can correspond to memory 132.

In the illustrated example, computer-readable media 306 also includes an operating system 310, which can correspond to operating system 134. The computer-readable media 306 can further include an application repository 312 and data store 314.

In the illustrated example, client device 302 can include interface(s) 316, which can correspond to interface(s) 138 and can represent, for example, network interface controllers (NICs), I/O interfaces, or other types of transceiver devices to send and receive communications over a network.

In the illustrated example, client device 302 can operably connect processing unit(s) 304 to computer-readable media 308, and network interface(s) 316 via a bus 318, which can correspond to bus 130. For simplicity other components are omitted from client device 302.

In at least one example, computer-readable media 304 can include a telemetry data support framework 320, which can correspond to telemetry data support framework 136. In various examples, the telemetry data support framework 320 includes a communication module 322. The communication module 322 can receive a signal from a computing device, such as 106 or 202 over a network 104. In various examples the signal may indicate a request for telemetry data of a full list of files in a file system of the client device 302. In some examples, the signal can indicate a request for telemetry data of a set of files in select folders that correspond to the operating system 310 or a computing application that is installed on the client device 302. In some examples, the communication module 322 can also transmit a signal to the computing device 106 or 202 that includes the requested telemetry data.

In at least one example, the telemetry data support framework 320 can include an identifier module 324. The identifier module 324 can generate a baseline file list 326 that corresponds to a request received via the communication module 322. In various examples, the files in the baseline file list 326 can correspond to a full list of files in a file system, or a set of files in select folders that correspond to the operating system 310 and/or a computing application installed on the client device 302. In some examples, the telemetry data in the baseline file list 326 can include an original filename, a corresponding file size, and/or a corresponding file location attribute for each file.

In various examples, the telemetry data support framework 320 can include a hash function module 328. The hash function module 328 can receive the baseline file list 326 from the identifier module 324 and generate a hash value for each filename. In some examples, the hash value can be generated using a one-way hash function.

In various examples, the telemetry data support framework 320 can also include a hashed file list module 330. In various examples, the hashed file list module 330 can receive the baseline file list 326 from the identifier module 324 and replace the original filenames of each file with a corresponding hash value that is determined by the hash function module 328. Therefore, the telemetry data in the hashed file list 332 can include a hash value of each filename, a corresponding file size and/or a corresponding file location attribute for each file. This process ensures that any user-identifiable information that could be revealed in a non-system filename or a non-reference data filename remains hidden as a hash value, therefore protecting the end user's privacy.

In various examples, functionality associated with blocks 322, 324, 328, and 330 can be combined to be performed by a fewer number of modules, or it can be split and performed by a larger number of modules. For example, a single module could perform the functions of the identifier module 324 and the hashed file list module 330, by generating a baseline list of files and subsequently modifying the list of files by replacing the original filenames with hash values.

Figure 4:
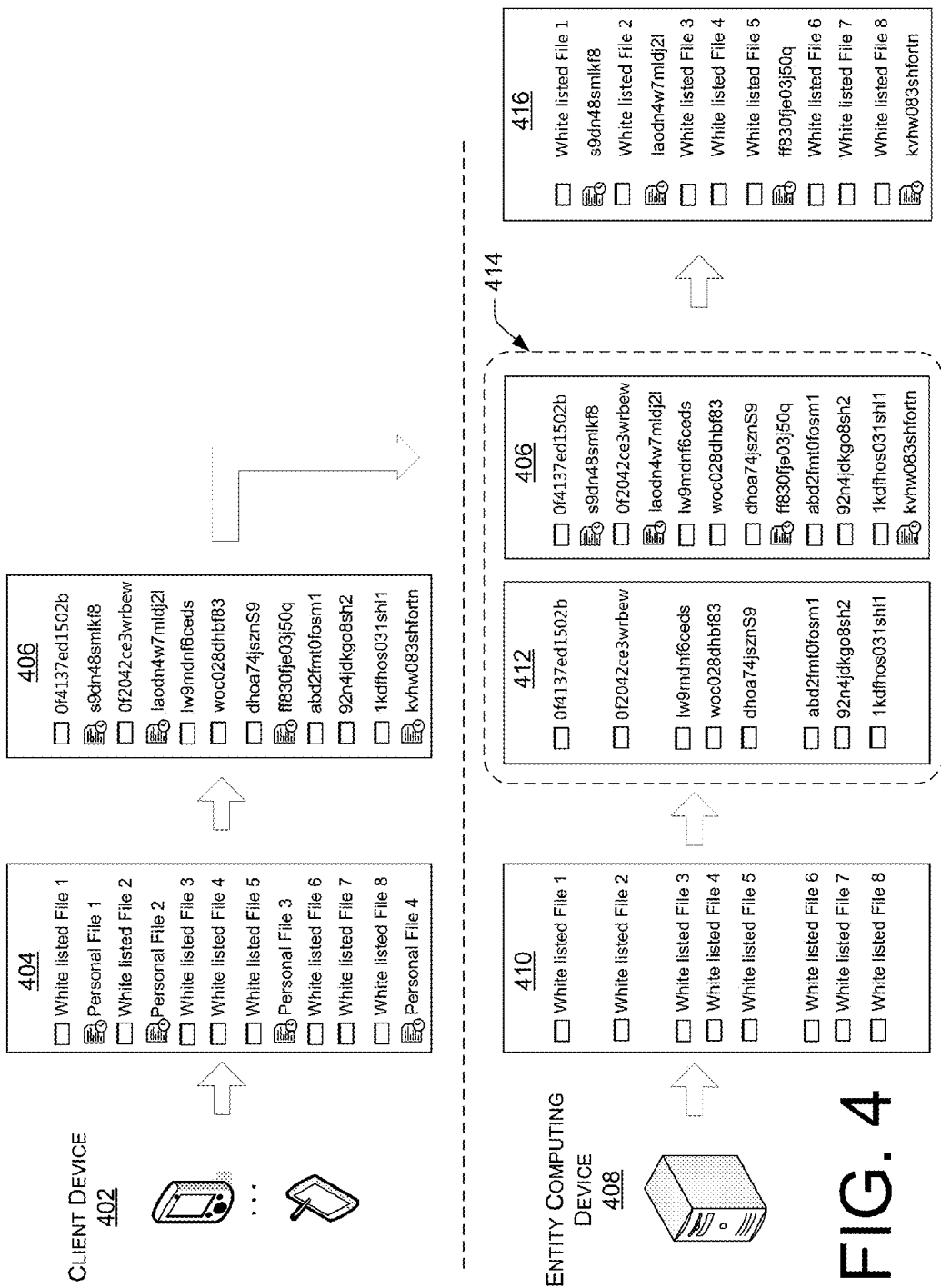
FIG. 4 is a pictorial diagram that illustrates a process of aggregating hash values associated with a list of files received from a client device with a list of files generated by a separate entity.

FIG. 4 illustrates a process of aggregating the hash values associated with a list of files received from the client device with a white list of files generated by a separate entity. In the illustrated example, a client device 402 generates an original file list 404. In various examples, the client device 402 can correspond to client device 124 or 302. In various examples, the original file list 404 can include a list of all files in a file system or a set of files in select folders that correspond to an operating system or computing application. The telemetry data for the original file list 404 can include an original filename, corresponding file size (not shown), and/or corresponding file location attribute (not shown) for each file.

In various examples, the original file list 404 can be modified to generate a hashed file list 406 by replacing original filenames of each file with corresponding hash values. In some examples, the hash values can be generated using a one-way hash function. The telemetry data in the hashed file list 406 can include a hash value that corresponds to an original filename, a corresponding file size (not shown), and/or a corresponding file location attribute (not shown) for each file.

In the illustrated example, an entity computing device 408 can generate a white list of files 410. The entity computing device 408 can correspond to computing device 106 or 202. The white list of files 410 can correspond to files associated with an operating system or a computing application. In some examples, the white list of files 410 can correspond to reference data files associated with the entity.

In various examples, the entity computing device 408 can generate a hashed white list 412 by replacing the original file names of each file with corresponding hash values. In some examples, the hash values can be generated using a one-way hash function. The telemetry data in the hashed white list 412 can include, but is not limited to, an original filename (not shown), a hash value that correspond to the original filename, a corresponding file size (not shown), and/or a corresponding file location attribute (not shown) for each file.

In the illustrated example, the entity computing device 408 can receive the hashed file list 406 and compare 414 the filename hash values on the hashed file list 406 with the filename hash values on the hashed white list 412.

In various examples, the entity computing device 408 can generate an aggregate file list 416 by replacing the matching filename hash values on the hashed file list 406 with the original filenames sourced from the hashed white list 412. This process ensures that any user-identifiable information that could be revealed in a non-white-listed filename remains hidden as a hash value, therefore protecting the end user's privacy.

Figure 5:
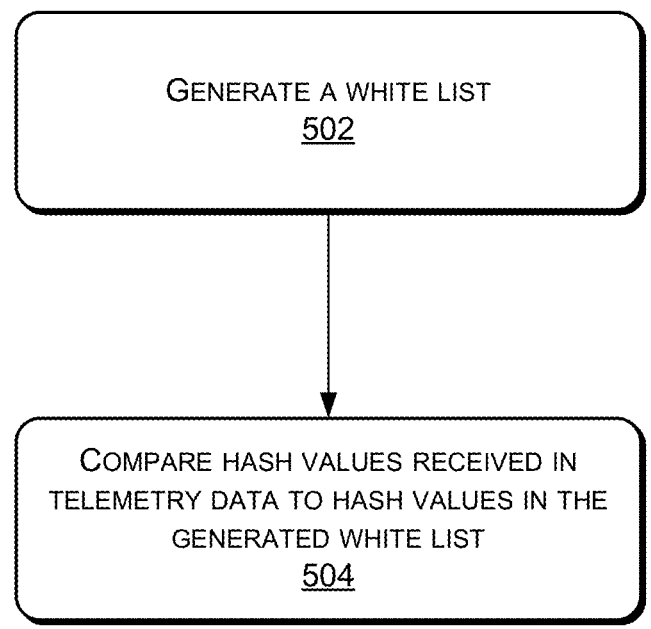
FIG. 5 is a flow diagram that illustrates a process flow of generating a white list for comparison to hash values received in telemetry data from a client device.

FIG. 5 illustrates a process flow of generating a white list for comparison to hash values received in telemetry data from a client device. In various examples, computing devices 106, such as distributed computing resources 102 or computing devices 202 can implement the process flow described by FIG. 5.

At 502, the computing device 106 or 202 can generate a white list. In at least one example, the white list can include a list of files associated with a computing application. In another example, the white list can include a list of files that correspond to an operating system. In various examples, the computing device 106 or 202 can generate a hash value for each filename in the white list. In some examples, the hash value can correspond to content of the files rather than the filename. In some examples, the hash value can be generated using a one-way hash function. Subsequently, the white list can include an original filename, a hash value of a filename and/or file content, a corresponding file size and/or a corresponding file location attribute.

At 504, the computing device 106 or 202 can compare the hash values that are received in the telemetry data from a client device 124 or 302 to hash values in the generated white list. In instances where a matching pair of hash values is identified, the computing device 106 or 202 can deduce that the file that is associated with the matching pair of hash values corresponds to a file on the white list. Subsequently, the file can be identified as corresponding to a file of a proprietary computing application, or a system file of an operating system or computing application.

Figure 6:
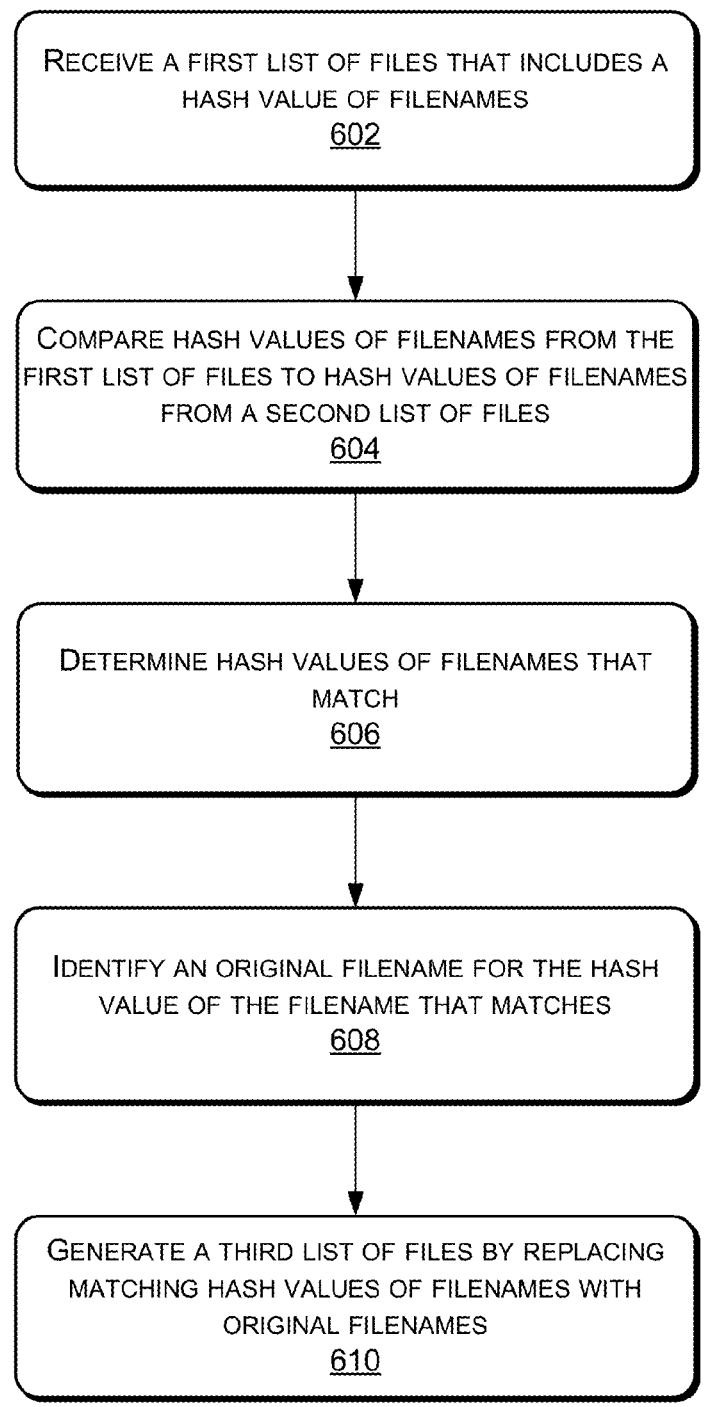
FIG. 6 is a flow diagram that illustrates a process flow of receiving a list of files from a client device and generating another list of files that includes original filenames for matching hash values.

FIG. 6 illustrates a process flow of receiving a list of files from a client environment and generating another list of files that includes original filenames for matching hash values. In various examples, computing device 106 or 202 can implement the process flow described by FIG. 6. At least one example can include an organization seeking telemetry data associated with the performance and use of a computing application. In various examples, the telemetry data can include measuring characteristics of files of the computing application, such as filenames, file content, corresponding file sizes, and corresponding file location attributes of each file. In some examples, a service provider can collect telemetry data corresponding to files for an operating system and/or a computing application, and the operations illustrated in FIG. 6 can be performed on distributed computing resources 102.

In various examples, the computing device 106 or 202 can receive a list of files that includes files that correspond to an operating system or computing application, and non-system files. In other examples, the computing device 106 or 202 can receive a list of files that include files from a proprietary computing application.

At 602, a computing device 106 or 202 can receive a first list of files from a client device 124 or 302. In various examples, the computing device 106 or 202 can receive the file list of files in response to transmitting a request for telemetry data to the client device 124 or 302. In some examples, a request for telemetry data can be generated, via a user interface, by selecting folders that correspond to files on the computing device 106 or 202. In other examples, the computing device 106 or 202 can request telemetry data for all files in a file system of the client device 124 or 302.

In various examples, the first list of files that is received by the computing device 106 or 202 can include telemetry data for each file in the list of files. The telemetry data can include a hash value of an original filename, a corresponding file size, and/or a corresponding file location attribute for each file in the list of files. In various examples, the hash value of the original filename can be generated using a one-way hash function. In other examples, the telemetry data can alternatively or additionally include a hash value that corresponds to file content.

At 604, the computing device 106 or 202 can compare hash values of filenames from the first list of files to hash values of filenames from a second list of files. In various examples, the second list of files can correspond to files associated with an operating system or a computing application. In some examples, the second list of files includes an original filename for each file in the list of files and a corresponding hash value of the filename. The computing device 106 or 202 can generate the second list of files using the process flow described in FIG. 5 at any point in time prior to step 604.

At 606, the computing device 106 or 202 can determine whether hash values of filenames from the first list of files and the second list of files match. In instances where a matching pair of hash values is identified, the computing device 106 or 202 can deduce with high probability that the filename that hashed to the hash value from the first list corresponds to the filename that hashed to the hash value in the second list.

At 608, the computing device 106 or 202 can identify an original filename for the hash values of the filename that matches. In various examples, the original filename can be identified from the second list of files that includes an original filename for each file in the list of files and a corresponding hash value of the filename.

At 610, the computing device 106 or 202 can generate a third list of files by replacing matching hash values of filenames in the first list with original filenames from the second list. In response to replacing all matching hash values of filenames on the list of files, the third list of files can identify all white-listed filenames with original filenames, and all non-white-listed filenames with hash values. This process can ensure that any user-identifiable information that could be revealed in non-white-listed filenames remains hidden as a hash value, thereby protecting the end user's privacy.

Figure 7:
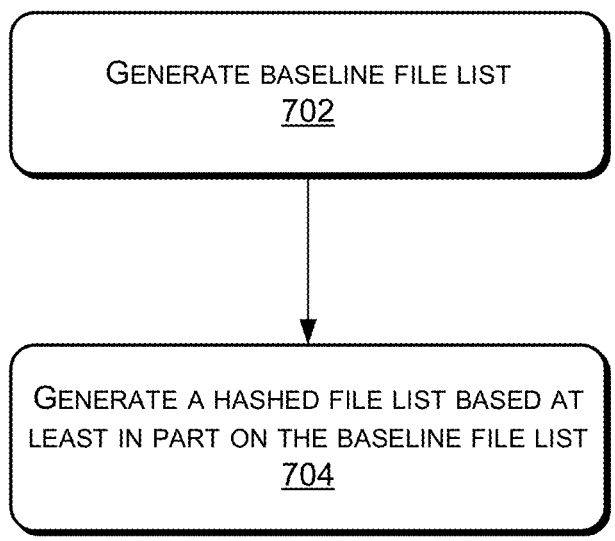
FIG. 7 is a flow diagram that illustrates a process flow of generating a hashed file list on a client device.

FIG. 7 illustrates a process flow of generating a hashed file list on a client device. The client device can correspond to 124 or 302.

At 702, the client device 124 or 302 can generate a baseline file list. In at least one example, the baseline file list can include a list of files in a file system of the client device, or a list of files in a select folder that corresponds to the operating system and/or a computing application. In some examples, the baseline list can include a list of files that correspond to a request received from a computing device 102 or 202. For example, a computing device 102 or 202 can transmit a request to the client device 124 or 302 that can indicate that telemetry data is requested for a list of files in a file system of client device 124 or 302. In various examples, the request can indicate that telemetry data is requested for a list of files in select folders that correspond to an operating system or computing application.

In some examples, the baseline file list can include an original filename, a corresponding file size, and/or a corresponding file location attribute for each file.

At 704, the client device 124 or 302 can generate a hash value that corresponds to the original filename of each file on the baseline file list. In some examples, the client device 124 or 302 can generate a hash value that corresponds to content of each file on the baseline file list. In various examples, a hashed file list is generated by replacing the original filenames of each file in the baseline file list with a corresponding hash value. In some examples, the corresponding hash values can be determined by a one-way hash function. The telemetry data in the hashed file list can include a hash value, a corresponding file size, and/or a corresponding file location attribute for each file.

Figure 8:
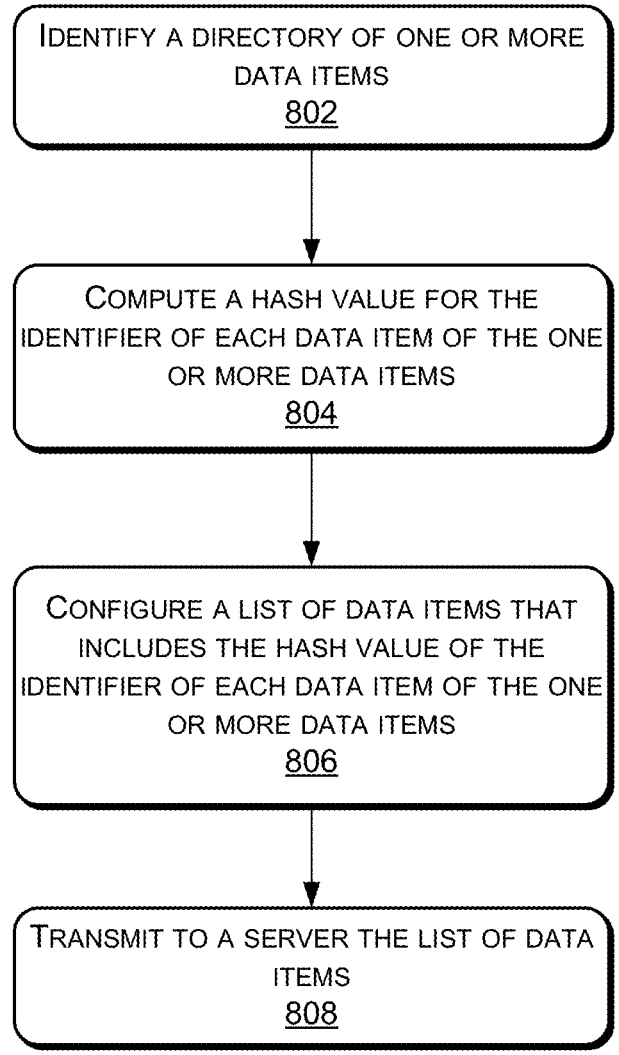
FIG. 8 is a flow diagram that illustrates a process flow of transmitting a list of files from a client device that includes hash values for filenames of files in the list of files.

FIG. 8 illustrates a process flow of transmitting a list of data items from a client device. In various examples, the client device can correspond to 124 or 302. In various examples, the data items can include files, directories, or labels. In some examples, the list of data items can include telemetry data associated with each data item in the list of data items. The telemetry data can include hash values of identifiers associated with each data item or hash values that correspond to content of the data items. In some examples, the data items can correspond to files or directories associated with an operating system or computing application and the identifiers can correspond to filenames or directory names. In some examples, the telemetry data can correspond to data items associated with a proprietary computing application.

At 802, the client device 124 or 302 can identify a directory of one or more data items. In some examples, the directory can correspond to a location that includes data items associated with an operating system or a computing application. In other examples, the directory can correspond to a location that includes data items associated with a proprietary computing application. In various examples, the directory of the one or more data items can be identified by an indication received from the computing device 106 or 202.

At 804, the client device 124 or 302 can compute a hash value for the identifier of each data item in the directory of one or more data items. In some examples, the hash values can be determined by a one-way hash function.

At 806, the client device 124 or 302 can configure a list of data items that includes the hash value of the identifier of each data item in the directory of one or more data items. The various examples, the telemetry data in the list of data items can include a hash value of an identifier of the data item, a corresponding size of the data item, and/or a corresponding location attribute for each data item. In various examples, the telemetry data can alternatively or additionally include a hash value that corresponds to content of the data item.

At 808, the client device 124 or 302 can transmit to a server, the configured list of data items. The process of replacing the original identifiers with corresponding hash values ensures that any user-identifiable information that could be revealed in a non-system identifier remains hidden as a hash value, thereby protecting the end user's privacy.

Example Clauses

A: A computer-implemented method, comprising, receiving, using a server, a first list of files, the first list of files including a hash value in place of a filename for a file in the first list of files; comparing the hash value of the filename from the first list of files to a hash value of a filename from a second list of files; determining that the hash value of the filename from the first list of files matches the filename from the second list of files; identifying an original filename for the hash value of the filename that matches; and generating a third list of files, by replacing on the first list of files, the hash value of the filename that matches with the original filename identified.

B: A computer-implemented method as paragraph A recites, wherein the first list of files includes at least one file attribute that corresponds to the filename. In various instances the at least one file attribute can include one or more of a file size, a location attribute, a right to access a file, security privileges for a file, a file version number, a creation time of a file, or a file access time that corresponds to the filename.

C: A computer-implemented method as either paragraph A or B recites, wherein the first list of files comprises all files in a file system of a client environment.

D: A computer-implemented method as any of paragraphs A-C recites, wherein the first list of files comprises files that correspond to at least one of an operating system or a computing application that is from a client environment.

E: A computer-implemented method as any of paragraphs A-D recites, further comprising, prior to receiving a first list of files from a client environment, transmitting, from the server, a signal to a client environment that identifies a select group of files to include in the first list of files.

F: A computer-implemented method as any of paragraphs A-E recites, wherein the first list of files includes white listed files that correspond to at least one of an operating system or a computing application, and non-white listed files associated with a user of a client environment.

G: A computer-implemented method as paragraph F recites, wherein the second list of files includes files that correspond to a new installation of at least one of the operating system or the computing application.

H: A computer-implemented method as any of paragraphs A-E recites, wherein: the first list of files includes files associated with a proprietary computing application and non-associated files; and the second list of files includes files that correspond to a new installation of the proprietary computing application.

I: A computer-readable medium having thereon computer-executable instructions to configure a computer to perform a method as any of paragraphs A-H recites.

J: A device comprising: a processor; and one or more computer-readable media having thereon computer-executable instructions to configure the device to perform a method as any of paragraphs A-H recites.

K: A system comprising, means for receiving a first list of files, the first list of files including a hash value in place of a filename for a file in the first list of files; means for comparing the hash value of the filename from the first list of files to a hash value of a filename from a second list of files; means for determining that the hash value of the filename from the first list of files matches the filename from the second list of files; means for identifying an original filename for the hash value of the filename that matches; and means for generating a third list of files, by replacing on the first list of files, the hash value of the filename that matches with the original filename identified.

L: A system as paragraph K recites, wherein the first list of files includes at least one file attribute that corresponds to the filename. In various instances the at least one file attribute can include one or more of a file size, a location attribute, a right to access a file, security privileges for a file, a file version number, a creation time of a file, or a file access time that corresponds to the filename.

M: A system as either paragraph K or L recites, wherein the first list of files comprises all files in a file system of a client environment.

N: A system as any of paragraphs K-M recites, wherein the first list of files comprises files that correspond to at least one of an operating system or a computing application that is from a client environment.

O: A system as any of paragraphs K-N recites, further comprising, means for, prior to receiving a first list of files from a client environment, transmitting a signal to a client environment that identifies a select group of files to include in the first list of files.

P: A system as any of paragraphs K-O recites, wherein the first list of files includes white listed files that correspond to at least one of an operating system or a computing application, and non-white listed files associated with a user of a client environment.

Q: A system as paragraph P recites, wherein the second list of files includes files that correspond to a new installation of at least one of the operating system or the computing application.

R: A system as any of paragraphs K-O recites, wherein: the first list of files includes files associated with a proprietary computing application and non-associated files; and the second list of files includes files that correspond to a new installation of the proprietary computing application.

S: A computing device, comprising: a processing unit; a computer readable medium operatively coupled to the processing unit and having a plurality of modules thereon, the plurality of modules including: an identifier module configured to, upon execution by the processing unit, identify a directory of one or more data items, each data item of the one or more data items having an identifier and an associated data item size; a hashing module configured to, upon execution by the processing unit, compute a hash value for the identifier of each individual data item of the one or more data items; a hash list module configured to, upon execution by the processing unit, configure a list of data items that includes the hash value of the identifier of each individual data item of the one or more data items and the associated data item size for transmission to a server; and an output interface configured to transmit to a server the list of data items that includes the hash value of the identifier of each individual data item of the one or more data items and the associated data item size.

T: A computing device as paragraph S recites, further comprising a communications module configured to, upon execution by the processing unit, to receive, from a server, an indication the directory of the one or more data items.

U: A computing device as either paragraph S or T recites, wherein the one or more data items include data items corresponding to at least one of an operating system or a computing application, and additional data items not corresponding to an operating system or computing application.

V: A computing device as any of paragraphs S-U recites, wherein the hash list module is further configured to, upon execution by the processing unit, configure the list of data items to include at least one data item attribute. In various instances, the at least one data item attribute can include one or more of a location attribute, access rights, security privileges, version number, creation time, or an access time for an individual data item of the one or more data items.

W: A computing device as any of paragraphs S-V recites wherein the data item corresponds to at least one of a file, a directory, or a label; and wherein the identifier corresponds to at least one of a filename, directory name or label.

X: A system comprising: a processing unit; a computer readable medium operatively coupled to the processing unit and having a plurality of modules thereon, the plurality of modules including: a communications module configured to, upon execution by the processing unit, receive a first list of files from a client environment, the first list of files including one or more files, at least one file of the one or more files having a hash value of a filename and an associated file size; and a file list comparison module configured to, upon execution by the processing unit: compare the hash value of the filename of the at least one file on the first list of files to hash values of filenames on a second list of files, the second list of files including one or more files having at least a filename and a hash value of the filename for each file; identify a hash value on the second list of files that matches the hash value of the at least one file on the first list of files; identify a filename from the second list of files for the matching hash value of the at least one file on the first list of files; and generate a third list of files, by replacing the matching hash value of the at least one file on the first list with a corresponding filename from the second list of files.

Y: A system as paragraph X recites, wherein the second list of files corresponds to files associated with a proprietary computing application.

Z: A system as either paragraph X or Y recites, wherein the first list of files includes files associated with a proprietary computing application and files not associated with a proprietary computing application, and wherein the third list of files includes filenames for files that correspond to the proprietary computing application and hash values of filenames for files that correspond to the files not associated with the proprietary computing application.

AA: A system as any of paragraphs X-Z recites, wherein the first list of files is received from a server that is accessed by a plurality of client devices and the plurality of client devices correspond to different users.

AB: A system as any of paragraphs X-AA recites, wherein the plurality of modules further comprises: a white-listing module configured to, upon execution by the processing unit, generate the second list of files at a point in time after receiving the first list of files, and perform a hash of filenames on the second list of files prior to file list comparison module identifying, on the first list of files, matching hash values.

AC: A system as any of paragraphs X-AB recites, wherein the plurality of modules further comprises: a user interface configured to, upon execution by the processing unit, receive a user input that selects one or more files that correspond to the first list of files; and wherein the communications module is further configured to, upon execution by the processing unit, transmit to the client environment the first list of files.

AD: A system as any of paragraphs X-AC recites, wherein the plurality of modules further comprises: a user interface module configured to, upon execution by the processing unit, receive user input that selects an operating system or a computing application from an list that includes at least one operating system or computing application; a white-listing module configured to, upon execution by the processing unit, identify one or more files that correspond to the selected operating system or the selected computing application; and wherein the communications module is further configured to, upon execution by the processing unit, transmit the one or more files that correspond to the selected operating system or the selected computing application, as the first list of files.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method, comprising:
    receiving, using a server, a first list of files of a file system of a client environment, the first list of files including a first hash value of a filename for a first file without including the filename for the first file, wherein the first list of files comprises both (i) white-listed files that correspond to at least one of an operating system or a computing application and (ii) personal files associated with a user of the client environment that are not white-listed;
    comparing the first hash value of the filename to a second hash value of the filename from a second list of files, wherein the second list of files comprises the white-listed files and not the personal files associated with the user, at least some of the white-listed files corresponding to a new installation of the at least one of the operating system or the computing application;
    determining that the first hash value of the filename matches the second hash value of the filename; and
    generating a third list of files, by replacing on the first list of files, the first hash value of the filename with the filename from the second list of files.

2. A computer-implemented method as claim 1 recites, wherein the first list of files includes at least one file attribute that corresponds to the filename.

3. A computer-implemented method as claim 1 recites, wherein:
    the first list of files comprises all files in the file system of the client environment, including the personal files; and
    the first hash value is used for the first file instead of the filename to prevent a transfer of user-identifiable information.

4. A computer-implemented method as claim 1 recites, further comprising, prior to receiving the first list of files from the client environment, transmitting, from the server, a signal to the client environment that identifies a select group of files to include in the first list of files.

5. A computer-implemented method as claim 1 recites, wherein:
    the first list of files comprises files associated with a proprietary computing application and files not associated with the proprietary computing application; and
    the second list of files comprises files that correspond to a new installation of the proprietary computing application.

6. A computing device, comprising:
    a processing unit; and
    memory storing instructions that, when executed by the processing unit, cause the computing device to:
        receive, from a server, an indication of a directory of one or more data items;
        identify the directory of the one or more data items, each data item of the one or more data items having a filename and an associated data item size, the directory of the one or more data items comprising all data items in a file system of a client environment, including personal data items of a user of the computing device and other data items corresponding to at least one of an operating system or a computing application;
        compute a hash value of the filename of each individual data item of the one or more data items;
        configure a list of the one or more data items that includes the hash value of the filename of each individual data item of the one or more data items and the associated data item size for transmission to a server, wherein the list includes a data item attribute for individual ones of the one or more data items; and
        transmit the list to the server.

7. A computing device as claim 6 recites, wherein an individual data item corresponds to at least one of a file, a directory, or a label.

8. A system comprising:
    a processing unit; and
    memory storing instructions that, when executed by the processing unit, cause the system to:
        receive a first list of files of a file system from a client environment, the first list of files including a first hash value of a filename in place of the filename, wherein the first list of files corresponds to files associated with a proprietary computing application and files not associated with the proprietary computing application;
        compare the first hash value of the filename to hash values of filenames on a second list of files, wherein the second list of files corresponds to the files associated with the proprietary computing application;
        determine that a second hash value on the second list of files matches the first hash value;
        identify, using the second hash value, the filename from the second list of files; and
        generate a third list of files, by replacing the first hash value on the first list of files with the filename identified from the second list of files, wherein the third list of files includes filenames for the files associated with the proprietary computing application and hash values of filenames for the files not associated with the proprietary computing application.

9. A system as claim 8 recites, wherein the first list of files is received from a server that is accessed by a plurality of client devices and the plurality of client devices correspond to different users.

10. A system as claim 8 recites, wherein the instructions further cause the system to generate the second list of files at a point in time after receiving the first list of files, and prior to determining that the first hash value matches the second hash value.

11. A system as claim 8 recites, wherein the instructions further cause the system to:
   receive a user input that selects one or more files that correspond to the first list of files; and
   transmit to the client environment the first list of files.

12. A system as claim 8 recites, wherein the instructions further cause the system to:
   receive user input that selects the proprietary computing application;
   identify, based on the user input, the files associated with the proprietary computing application; and
   transmit the files associated with the proprietary computing application in association with the first list of files.

\* \* \* \* \*